(12) United States Patent
Higuchi et al.

(10) Patent No.: US 7,622,608 B2
(45) Date of Patent: Nov. 24, 2009

(54) METHOD FOR REGENERATING BASIC ANION-EXCHANGE RESIN

(75) Inventors: Shinya Higuchi, Chiyoda-ku (JP); Jun Hoshikawa, Chiyoda-ku (JP); Hiroki Kamiya, Chiyoda-ku (JP); Yasuhiko Matsuoka, Chiyoda-ku (JP); Hiroshi Funaki, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/057,556

(22) Filed: Mar. 28, 2008

(65) Prior Publication Data
US 2008/0182913 A1 Jul. 31, 2008

Related U.S. Application Data

(63) Continuation of application No. PCT/JP2006/318200, filed on Sep. 13, 2006.

(30) Foreign Application Priority Data
Oct. 14, 2005 (JP) ............................. 2005-300068

(51) Int. Cl.
C07C 53/21 (2006.01)
(52) U.S. Cl. .................................................... 562/605
(58) Field of Classification Search ................. None
See application file for complete search history.

(56) References Cited

U.S. PATENT DOCUMENTS 3,882,153 A * 5/1975 Seki et al. .................... 554/184
4,282,162 A * 8/1981 Kuhls ......................... 554/193
6,613,941 B1 * 9/2003 Felix et al. .................. 562/605
6,642,415 B1 11/2003 Führer et al.
2004/0010156 A1 * 1/2004 Kondo et al. ................ 554/177
2007/0025902 A1 * 2/2007 Hintzer et al. ............ 423/240 S

FOREIGN PATENT DOCUMENTS

| GB | 1314607 | * | 4/1973 |
| JP | 63-2656 | | 1/1988 |
| JP | 2001-062313 | | 3/2001 |
| JP | 2002-059160 | | 2/2002 |
| JP | 2003-512931 | | 4/2003 |

* cited by examiner

Primary Examiner—Karl J Puttlitz
(74) Attorney, Agent, or Firm—Oblon, Spivak, McClelland, Maier & Neustadt, L.L.P.

(57) ABSTRACT

A simple and efficient method for regenerating a basic anion-exchange resin, whereby at the time of removing a fluorinated emulsifier from a basic anion-exchange resin having the fluorinated emulsifier adsorbed thereon, it is unnecessary to provide a safety device/recovery technique necessary for handling an organic solvent by the use of a combustible organic solvent represented by an alcohol, and a burden imposed by e.g. treatment against COD load, is eliminated.

A basic anion-exchange resin having a fluorinated emulsifier adsorbed thereon is contacted with an aqueous alkaline solution having a temperature of from 60 to 105° C. to elute the fluorinated emulsifier thereby to regenerate the basic anion-exchange resin.

10 Claims, No Drawings

METHOD FOR REGENERATING BASIC ANION-EXCHANGE RESIN

TECHNICAL FIELD

The present invention relates to a method for regenerating a basic-anion-exchange resin by eluting a fluorinated emulsifier from a basic anion-exchange resin having the fluorinated emulsifier adsorbed thereon.

BACKGROUND ART

In the production of a fluorinated polymer such as a polytetrafluoroethylene (hereinafter referred to as PTFE), a melt-processable fluororesin or a fluoroelastomer by aqueous emulsion polymerization, it is common to employ a fluorinated emulsifier as an emulsifier to prevent an inhibition of the polymerization reaction by chain transfer in the aqueous medium.

A powder of a fluorinated polymer obtainable by coagulation and drying of an aqueous emulsion of the fluorinated polymer obtained by the aqueous emulsion polymerization, is used for various applications. Further, an aqueous dispersion of the fluorinated polymer obtainable by concentrating or applying stabilization treatment, as the case requires, to the aqueous emulsion of the fluorinated polymer, is used for various coating applications or impregnation applications together with various additives.

However, the fluorinated emulsifier to be used as an emulsifier is expensive, and the amount of its use is substantially influential over the production cost of the fluorinated polymer. Further, the fluorinated emulsifier is a substance which is not easily decomposable in nature, and accordingly, in recent years, it is desired to reduce the amount of not only a fluorinated emulsifier contained in a waste water from coagulation of an aqueous emulsion of the fluorinated polymer, discharged from a plant, but also a fluorinated emulsifier contained in an aqueous dispersion of the fluorinated polymer to be commercially sold.

As a method to reduce a fluorinated emulsifier in the aqueous dispersion of the fluorinated polymer, a method has been proposed wherein the aqueous dispersion of the fluorinated polymer itself is contacted with a basic anion-exchange resin. Further, some methods have also been proposed to recover the fluorinated emulsifier from the basic ion-exchange resin.

For example, as a method for eluting an adsorbed, fluorinated emulsifying-acid from a basic anion-exchange resin, a method of employing a mixture of a diluted mineral acid and an organic solvent, specifically a mixed liquid of concentrated hydrochloric acid and an alcohol is disclosed (Patent Document 1). Further, an elution method is also proposed wherein a combination of an aqueous alkaline solution and an organic solvent, specifically a combination of sodium hydroxide or ammonia, and methanol is employed (Patent Document 2). Further, a method is also proposed wherein a basic anion-exchange resin is contacted with an aqueous solution containing a fluorinated surfactant (also called as a fluorinated emulsifier) having hydrochloric acid added thereto, to have the fluorinated emulsifier adsorbed on the basic anion-exchange resin, and then the fluorinated emulsifier is eluted with an alkaline solution containing an organic solvent, specifically a mixture of sodium hydroxide and an alcohol (Patent Document 3). Further, an elution method is further proposed wherein a mixture of ammonia and a water-miscible organic solvent, specifically a mixture of ammonia and methanol, is employed (Patent Document 4).

Patent Document 1: JP-B-63-2656
Patent Document 2: JP-A-2001-62313
Patent Document 3: JP-A-2002-59160
Patent Document 4: JP-A-2003-512931

DISCLOSURE OF THE INVENTION

Problems to be Solved by the Invention

In these prior art techniques, it is the basic idea of the techniques to employ an aqueous acid or alkaline solution and an organic solvent which is basically represented by an alcohol. An alcohol is an inflammable organic solvent, and in view of the necessity to provide a safety device/recovery technique necessary for its handling or to deal with a COD (chemical oxygen demand) load, a simpler, more efficient and inexpensive recovery technique is desired.

Further, these prior art techniques do not teach a specific manner of eluting the fluorinated emulsifier from the basic anion-exchange resin after contacting the aqueous dispersion of the fluorinated polymer itself with the basic anion exchange resin. Further, the group of prior art techniques to elute a fluorinated emulsifier from a basic anion-exchange resin is directed to recovery of a fluorinated emulsifier in an aqueous solution of waste water type, and it is the basic idea of the techniques to add, for example, hydrochloric acid to the aqueous solution to be treated. Thus, these prior art techniques do not show any specific data relating to regeneration and recycling such that a fluorinated surfactant contained in an aqueous emulsion is adsorbed by a basic anion-exchange resin, then from the basic anion-exchange resin, the fluorinated surfactant is eluted to regenerate the basic anion-exchange resin, and again, from the aqueous emulsion, a fluorinated surfactant is adsorbed. Further, with respect to the proposals for the elution temperature, room temperature, from 15° C. to 25° C., from 0° C. to 50° C. and from room temperature to 50° C., are proposed, and surprisingly, there has been no technique disclosed which mentions that the elution efficiency remarkably increases by further raising the temperature even without using an inflammable organic solvent.

Means to Solve the Problems

The present inventors have conducted an extensive study and as a result, have accomplished the present invention. Namely, the present invention provides the following.

(1) A method for regenerating a basic anion-exchange resin, which comprises contacting a basic anion-exchange resin having a fluorinated emulsifier adsorbed thereon with an aqueous alkaline solution having a temperature of from 60 to 105° C. to elute the fluorinated emulsifier thereby to regenerate the basic anion-exchange resin.

(2) The method for regenerating a basic anion-exchange resin according to the above (1), wherein the basic anion-exchange resin having a fluorinated emulsifier adsorbed thereon is one having a fluorinated emulsifier adsorbed on a basic anion-exchange resin by contacting the basic anion-exchange resin with an aqueous dispersion of a fluorinated polymer.

(3) The method for regenerating a basic anion-exchange resin according to the above (1), wherein the basic anion-exchange resin having a fluorinated emulsifier adsorbed thereon is one having a fluorinated emulsifier adsorbed on a basic anion-exchange resin by contacting the basic anion-exchange resin with a waste water containing a fluorinated emulsifier discharged after coagulation of an aqueous dispersion of a fluorinated polymer.

(4) The method for regenerating a basic anion-exchange resin according to the above (1), wherein the basic anion-exchange resin having a fluorinated emulsifier adsorbed thereon is one having a fluorinated emulsifier adsorbed on a basic anion-exchange resin by contacting the basic anion-exchange resin with an aqueous solution having absorbed therein a fluorinated emulsifier contained in air discharged in a step of drying a fluorinated polymer obtained by coagulation of an aqueous dispersion of the fluorinated polymer.

(5) The method for regenerating a basic anion-exchange resin according to any one of the above (1) to (4), wherein the basic anion-exchange resin is a weakly-basic anion-exchange resin.

(6) The method for regenerating a basic anion-exchange resin according to any one of the above (1) to (5), wherein the basic anion-exchange resin has an ion exchange capacity of from 1 to 2.5 eq/L.

(7) The method for regenerating a basic anion-exchange resin according to any one of the above (1) to (6), wherein the amount of the fluorinated emulsifier adsorbed on the basic anion-exchange resin is from 5 to 60 mol % based on the ion exchange capacity of the basic anion-exchange resin.

(8) The method for regenerating a basic anion-exchange resin according to any one of the above (1) to (7), wherein the molar ratio of the alkali to the fluorinated emulsifier in the aqueous alkaline solution is from 1:1 to 200:1.

(9) The method for regenerating a basic anion-exchange resin according to any one of the above (1) to (8), wherein the fluorinated emulsifier is a fluorinated organic acid which may have an etheric oxygen atom, or its salt (ammonium salt or alkali metal salt).

(10) The method for regenerating a basic anion-exchange resin according to any one of the above (1) to (9), wherein the fluorinated polymer contained in the aqueous dispersion of the fluorinated polymer is at least one member selected from the group consisting of a polytetrafluoroethylene, a modified polytetrafluoroethylene, a tetrafluoroethylene/hexafluoropropylene copolymer, a tetrafluoroethylene/perfluoro(alkyl vinyl ether) copolymer, an ethylene/tetrafluoroethylene copolymer, an ethylene/chlorotrifluoroethylene copolymer, a polychlorotrifluoroethylene, a polyvinylidene fluoride, a polyvinyl fluoride, a tetrafluoroethylene/propylene copolymer, a tetrafluoroethylene/propylene/vinylidene fluoride copolymer, a vinylidene fluoride/hexafluoropropylene copolymer and a vinylidene fluoride/hexafluoropropylene/tetrafluoroethylene copolymer.

EFFECTS OF THE INVENTION

By the method for regenerating a basic anion-exchange resin of the present invention, it is possible to efficiently elute a fluorinated emulsifier adsorbed on the basic anion-exchange resin thereby to regenerate the basic anion-exchange resin. Further, the regenerated basic anion-exchange resin has an excellent performance to adsorb a fluorinated emulsifier and thus is capable of adsorbing a fluorinated emulsifier repeatedly. It is thereby possible to remove a fluorinated emulsifier from a coagulation waste water or from an aqueous dispersion of a fluorinated polymer and to prevent discharge of the fluorinated emulsifier to the environment, while minimizing the cost for regeneration. By the method for regenerating a basic anion-exchange resin of the present invention, it is not necessary to use an organic solvent such as an alcohol, whereby no removal of an organic solvent is required, and there will be no substantial influence to the environment such as deterioration of water by inclusion of an organic solvent. Further, there will be such an effect that the fluorinated emulsifier eluted from the basic anion-exchange resin can be efficiently recovered by a simple process.

BEST MODE FOR CARRYING OUT THE INVENTION

The basic anion-exchange resin to be used in the present invention may be a strongly basic anion-exchange resin or a weakly basic anion-exchange resin, preferably a weakly basic anion-exchange resin.

The basic anion-exchange resin may be a granular resin made of e.g. a styrene/divinylbenzene cross-linked resin, an acryl/divinylbenzene cross-linked resin or a cellulose resin, having amino groups as ion exchange groups. Among them, a granular resin made of a styrene/divinylbenzene cross-linked resin having amino groups as ion exchange groups, is preferred.

The basic anion-exchange resin is preferably one having primary to tertiary amino groups or quaternary ammonium salts as exchange groups. More preferred is one having secondary or tertiary amino groups as exchange groups. Further, from the viewpoint of heat resistance, the basic anion-exchange resin is particularly preferably one having tertiary amino groups as exchange groups.

A basic anion-exchange resin having quaternary ammonium salts as exchange groups is susceptible to deposition of a fluorinated polymer on the ion exchange resin surface and becomes incapable of removing a fluorinated emulsifier in a relatively short time, and further, the adsorption of the fluorinated emulsifier is strong so that the elution becomes low. The deposition of the fluorinated polymer on the resin surface is considered to be attributable to the fact that the exchange groups of quaternary ammonium salts have too strong absorptivity of anion components and thus react with e.g. —COOH groups at the molecular terminals of the fluorinated polymer.

The average particle size of the basic anion-exchange resin is preferably from 0.1 to 2 mm, more preferably from 0.2 to 1.3 mm, particularly preferably from 0.3 to 0.8 mm. The particles of the basic anion-exchange resin are preferably uniform, whereby flow paths tend to be hardly clogged during liquid flow. Further, the basic anion-exchange resin is preferably porous, and a porous type or macroporous type having a high degree of cross-linking is more preferred. The ion exchange capacity of the basic anion exchange resin is preferably from 0.1 to 2.5 (eq/L), more preferably from 1.3 to 1.7 (eq/L). A commercial product of a preferred basic anion exchange resin may, for example, be Lewatit (registered trademark) MP-62WS manufactured by LANXESS K.K., DIAION (registered trademark) WA-30 manufactured by Mitsubishi Chemical Corporation or DOWEX MARATHON (registered trademark) WBA manufactured by DOW.

In the present invention, the fluorinated emulsifier to be adsorbed on the basic anion-exchange resin may, for example, be a fluorinated organic acid which may have an etheric oxygen atom, or its salt (ammonium salt or alkali metal salt), or a fluorinated sulfonic acid or its salt (ammonium salt or alkali metal salt). Among them, a fluorinated organic acid which may have an etheric oxygen atom, or its salt, is preferred. As the fluorinated emulsifier, an ammonium salt of the above acid is particularly preferred.

The fluorinated organic acid may, for example, be perfluorohexanoic acid, perfluoroheptanoic acid, perfluorooctanoic acid or perfluorononanoic acid.

The fluorinated organic acid having an etheric oxygen atom may, for example, be perfluoro-2,5-dimethyl-3,6-dioxanonanoic acid, $C_4F_9OC_2F_4OCF_2COOH$, $C_3F_7OC_2F_4OCF_2COOH$, $C_2F_5OC_2F_4OCF_2COOH$, $CF_3OC_2F_4OCF_2COOH$, $C_4F_9OCF_2COOH$ or $C_4F_9OCF(CF_3)COOH$.

A hydrogen-containing fluorinated emulsifier may, for example, be ω-hydroperfluorooctanoic acid.

The fluorinated sulfonic acid may, for example, be perfluorooctane sulfonic acid or $C_6F_{13}CH_2CH_2SO_3H$.

As the basic anion-exchange resin having a fluorinated emulsifier adsorbed, to be used in the present invention, it is possible to employ a basic anion-exchange resin having a fluorinated emulsifier adsorbed by various methods.

As a specific example, it may be:

a basic anion exchange resin having a fluorinated emulsifier adsorbed by contacting the basic anion-exchange resin with an aqueous dispersion of a fluoropolymer obtained by stabilizing, by an addition of a non-ionic surfactant, an aqueous emulsion of the fluorinated polymer obtained by emulsion polymerization of a fluorinated monomer in the presence of a fluorinated emulsifier, followed by concentration, as the case requires;

a basic anion-exchange resin having a fluorinated emulsifier adsorbed on the basic anion-exchange resin by contacting the basic anion-exchange resin with a waste water containing the fluorinated emulsifier discharged after coagulation of the above aqueous dispersion of the fluorinated polymer; or a basic anion exchange resin having a fluorinated emulsifier adsorbed thereon by contacting the basic anion-exchange resin with an aqueous solution having adsorbed therein a fluorinated emulsifier contained in air discharged in a step of drying a fluorinated polymer obtained by coagulation of the above aqueous dispersion of the fluorinated polymer.

The method of contacting the basic anion-exchange resin with the fluorinated emulsifier for adsorption of the emulsifier is not particularly limited. It may specifically be a method wherein the basic anion exchange resin is put into the aqueous dispersion of the fluorinated polymer or into the aqueous solution containing the fluorinated emulsifier, or a method wherein the basic anion-exchange resin is packed into a column, and the aqueous solution containing a fluorinated emulsifier or the aqueous dispersion of the fluorinated polymer is passed therethrough. When a fluorinated emulsifier in the aqueous dispersion of the fluorinated polymer is to be adsorbed, it is advisable to preliminarily remove a floating solid such as coagulum by a filter. It is advisable to carry out the filtration of the aqueous dispersion of the fluorinated polymer by means of a single stage filter or a group of plural stage filters, having a mesh size of 100 μm.

At the time of contacting the basic anion-exchange resin with the fluorinated emulsifier for adsorption of the emulsifier, the contacting temperature may suitably be selected, but it is usually preferably around room temperature i.e. from 10 to 40° C. Further, the contacting time may suitably be selected, but in the case of contacting in a stirring system, it is usually preferably within a range of from 10 minutes to 200 hours. The contacting pressure is usually preferably atmospheric pressure, but it may be a reduced pressure or an elevated pressure.

The fluorinated polymer contained in the aqueous dispersion of the fluorinated polymer to be used in the present invention may, for example, be a fluororesin or a fluorinated elastomer.

The fluororesin may, for example, be a polytetrafluoroethylene (PTFE) as a homopolymer of tetrafluoroethylene (hereinafter referred to as TFE), a modified PTFE having no melt processability as a copolymer of TFE with at least one fluorinated comonomer selected from hexafluoropropylene (HFP), perfluoro(alkyl vinyl ether) (PFAVE), chlorotrifluoroethylene (CTFE), (perfluoroalkyl)ethylene, vinylidene fluoride (VdF) and perfluoro(alkenyl vinyl ether), or a melt processable fluororesin.

In the modified PTFE, the content of constituting units based on comonomers is preferably at most 0.5 mass %, more preferably at most 0.4 mass %. Further, PFAVE may, for example, a perfluoro(propyl vinyl ether) or perfluoro(methyl vinyl ether).

The melt-processable fluororesin may, for example, be a TFE/HFP copolymer (FEP), a TFE/PFAVE copolymer (PFA), an ethylene/TFE copolymer (ETFE), an ethylene/chlorotrifluoroethylene copolymer (ECTFE), a polychlorotrifluoroethylene, a polyvinylidene fluoride or a polyvinyl fluoride.

The fluorinated elastomer may, for example, be a TFE/propylene copolymer, a TFE/propylene/VdF copolymer, a VdF/HFP copolymer, a VdF/HFP/TFE copolymer (FKM) or a TFE/PFAVE copolymer (FFKM). In FFKM, PFAVE is preferably a perfluoro(methyl vinyl ether).

The fluorinated polymer is preferably at least one member selected from the group consisting of PTFE, a modified PTFE, a TFE/HFP copolymer, a TFE/PFAVE copolymer, ETFE, ECTFE, a polychlorotrifluoroethylene, a polyvinylidene fluoride, a polyvinyl fluoride, a TFE/propylene copolymer, a TFE/propylene/VdF copolymer, a VdF/HFP copolymer and a VdF/HFP/TFE copolymer.

Further, in a case where the aqueous dispersion of the fluorinated polymer to be used in the present invention is made of a raw material which is an aqueous emulsion of the fluorinated polymer obtained by emulsion polymerization of a fluorinated monomer in the presence of a fluorinated emulsifier, it is preferably an aqueous dispersion of the fluorinated polymer having such an aqueous emulsion of the fluorinated polymer stabilized with a nonionic surfactant. Such a nonionic surfactant may, for example, be a surfactant of the formula (A) and/or the formula (B).

Formula (A): $R^1$—O-A-H (wherein $R^1$ is a $C_{8-18}$ alkyl group, and A is a polyoxyalkylene group comprising from 5 to 20 oxyethylene groups and from 0 to 2 oxypropylene groups.)

Formula (B): $R^2$—$C_6H_4$—O—B—H (wherein $R^2$ is a $C_{4-12}$ alkyl group, and B is a polyoxyethylene chain comprising from 5 to 20 oxyethylene groups.)

A specific example of the nonionic surfactant of the Formula (A) may, for example, be a nonionic surfactant having a molecular structure such as $C_{13}H_{27}$—$(OC_2H_4)_{10}$—OH, $C_{12}H_{25}$—$(OC_2H_4)_{10}$—OH, $C_{10}H_{21}CH(CH_3)CH_2$—$(OC_2H_4)_9$—OH, $C_{13}H_{27}$—$(OC_2H_4)_8$—$OCH(CH_3)CH_2$—OH, $C_{16}H_{33}$—$(OC_2H_4)_{10}$—OH or $HC(C_5H_{11})(C_7H_{15})$—$(OC_2H_4)_9$—OH. A commercial product may, for example, be Tergitol (registered trademark) 15S series manufactured by Dow, NEWCOL (registered trademark) series manufactured by Nippon Nyukazai Co., Ltd., or LIONOL registered trademark) TD series manufactured by LION CORPORATION.

A specific example of the nonionic surfactant of the Formula (B) may, for example, be a nonionic surfactant having a molecular structure such as $C_8H_{17}$—$C_6H_4$—$(OC_2H_4)_{10}$—OH or $C_9H_{19}$—$C_6H_4$—$(OC_2H_4)_{10}$—OH. A commercial product may, for example, be TRITON (registered trademark) X series manufactured by Dow, or NIKKOL (registered trademark) OP series or NP series manufactured by Nikko Chemicals Co., Ltd. The content of the nonionic surfactant of the Formula (A) and/or the Formula (B) is preferably from 1 to 20 mass %, more preferably from 1 to 10 mass %, particularly preferably from 2 to 8 mass %, based on the mass of PTFE.

The amount of the fluorinated emulsifier adsorbed on the basic anion-exchange resin is usually preferably from 5 to 60 mol %, more preferably from 10 to 50 mol %, of the theoretical ion exchange capacity. The larger the amount of the fluorinated emulsifier adsorbed, the larger the amount of elution, but when the basic anion exchange resin is regenerated and recycled for use, the efficiency of adsorption of the fluorinated emulsifier tends to be low.

The aqueous alkaline solution to be used in the present invention is an aqueous solution of a hydroxide of an alkali metal, and it may, for example, be an aqueous sodium hydroxide solution, an aqueous potassium hydroxide solution, an aqueous rubidium hydroxide solution, an aqueous cesium hydroxide solution or an aqueous lithium hydroxide solution. At least one type of such aqueous solutions is employed. Among them, an aqueous sodium hydroxide solution or an aqueous potassium hydroxide solution is preferred.

With respect to the concentration of the aqueous alkaline solution, usually, as the alkaline concentration is high, the amount of the fluorinated emulsifier to be eluted tends to decrease. Accordingly, it is preferably from 0.5 to 10 mass %, more preferably from 1.0 to 5.0 mass %, particularly preferably 1.0 to 4.0 mass %.

The temperature of the heated aqueous alkaline solution to be contacted to the basic anion-exchange resin having the fluorinated emulsifier adsorbed thereon, is from 60 to 105° C. As the temperature is raised, the amount of elution increases. However, if the temperature is too high, deterioration of the basic anion-exchange resin will be accelerated, and if it exceeds substantially over the boiling point of water, a special apparatus will be required, such being economically disadvantageous. It is preferably from 70° C. to 100° C., more preferably from 75° C. to 95° C. The pressure at the time of contacting the basic anion exchange resin having the fluorinated emulsifier adsorbed thereon with the heated aqueous alkaline solution, is usually atmospheric pressure, but it may be a reduced pressure or an elevated pressure.

The time for contacting the basic anion-exchange resin having the fluorinated emulsifier adsorbed thereon with the heated aqueous alkaline solution is not particularly limited, but it is preferably from 20 minutes to two hours, more preferably from 30 minutes to two hours, most preferably from 40 minutes to two hours. If the contacting time exceeds two hours, the amount of the fluorinated emulsifier to be eluted tends to no longer increase. The contacting time within two hours is sufficient, and there is a characteristic such that even is with a short contact time of from 20 to 40 minutes, the fluorinated emulsifier can be sufficiently eluted. With a contacting time of less than 20 minutes, the elution tends to be insufficient.

The method of contacting the basic anion-exchange resin having the fluorinated emulsifier adsorbed thereon with the heated aqueous alkaline solution to elute the fluorinated emulsifier may, for example, be a method wherein the basic anion-exchange resin is put into the heated aqueous alkaline solution, or a method wherein the basic anion-exchange resin is packed into a column, and the heated aqueous alkaline solution is passed therethrough. The amount of the heated aqueous alkaline solution to be used is substantially influenced by the amount of the fluorinated emulsifier to be adsorbed, but it is an amount of the aqueous solution so that the molar ratio of the alkali to the fluorinated emulsifier in the aqueous solution becomes preferably from 1:1 to 200:1, more preferably from 1:1 to 100:1, most preferably from 2:1 to 50:1.

After letting the basic anion-exchange resin adsorb the fluorinated emulsifier from the aqueous dispersion of the fluorinated polymer and before contacting it with the heated aqueous alkaline solution, it is advisable to preliminarily remove the aqueous dispersion of the fluorinated polymer from the basic anion-exchange resin by washing with water. Especially in the case of contacting the basic anion-exchange resin with the heated aqueous alkaline solution in a column, if the aqueous dispersion of the fluorinated polymer remains, the fluorinated polymer will precipitate. Every time when the basic anion-exchange resin is reused, the fluorinated polymer will accumulate. And, when the aqueous dispersion of the fluorinated polymer is passed therethrough, the accumulated fluorinated polymer serves as nucleus, and precipitation of the fluorinated polymer from the aqueous dispersion of the fluorinated polymer tends to be further accelerated, or the flow in the column tends to be non-uniform. Therefore, the amount of the fluorinated polymer deposited on the basic anion-exchange resin is preferably at most 2 mass %, based on the total amount of the fluorinated polymer and the basic anion-exchange resin. It is preferred to carry out washing with water until turbidity of the washing water will no longer be observed so that the deposited amount of the fluorinated polymer is controlled to be more preferably at most 1 mass %.

The number of times of contacting the basic anion-exchange resin having the fluorinated emulsifier adsorbed thereon with the heated aqueous alkaline solution may be only once or at least twice. It is more preferably from once to five times. At the time of contacting for the second or subsequent time, the heated aqueous alkaline solution already used for contacting may be re-used, but it is preferred to use a fresh heated aqueous alkaline solution. The heated aqueous alkaline solution once contacted with the basic anion-exchange resin may be used after removing the eluted fluorinated emulsifier, again as a heated aqueous alkaline solution. By increasing the number of contacting times, the proportion for elution of the fluorinated emulsifier can be made high, and finally, it can be made 100%. However, if the number of contacting times is increased, the workload increases accordingly, such being disadvantageous. The number of contacting times is preferably at most five times.

According to the present invention, it is possible to elute the fluorinated emulsifier at a high proportion from the basic anion exchange resin having the fluorinated emulsifier adsorbed thereon. For example, by contacting the basic anion-exchange resin having the fluorinated emulsifier adsorbed thereon with the heated aqueous alkaline solution once, it is possible to easily elute at least 50 mass % of the fluorinated emulsifier, and further, it is possible to easily elute at least 70 mass % of the fluorinated emulsifier.

The basic anion-exchange resin regenerated by the present invention has an excellent performance to adsorb the fluorinated emulsifier and thus can be used for the adsorption of a fluorinated emulsifier repeatedly. The conditions to adsorb the fluorinated emulsifier may be the same as the above mentioned conditions for adsorption.

Further, by the present invention, it is possible to easily recover the fluorinated emulsifier from the aqueous alkaline solution containing the eluted fluorinated emulsifier. For example, the fluorinated emulsifier eluted to the heated aqueous alkaline solution may be purified and easily recovered by a known method, such as a method wherein the aqueous alkaline solution is cooled as it is, or an acid is added thereto, followed by cooling, for recrystallization, or a method wherein in order to facilitate precipitation, the aqueous alkaline solution is concentrated by evaporating water therefrom, and then an acid is added for precipitation and separation.

EXAMPLES

Now, the present invention will be described in further detail with reference to Examples and Comparative Examples, but it should be understood that the present invention is by no means thereby restricted. Methods for measuring the physical property values disclosed in Examples are as follows.

(A) Average primary particle size (unit: μm) of PTFE: Measured by using a laser scattering particle size distribution analyzer (tradename "LA-920", manufactured by HORIBA, Ltd.).

(B) Standard specific gravity (hereinafter referred to also as SSG): Measured in accordance with ASTM D1457-91a and D4895-91a. 12.0 g of PTFE was weighed and held in a cylindrical mold having an inner diameter of 28.6 mm under 34.5 MPa for 2 minutes. This is put in an oven of 290° C. and heated at a rate of 120° C./hr. It was held at 380° C. for 30 minutes, then cooled at a rate of 60° C./hr and held at 294° C. for 24 minutes. After holding it in a desiccator at 23° C. for 12 hours, the specific gravity value of the molded product to water at 23° C. was measured, and it was taken as the standard specific gravity.

(C) Concentration of ammonium perfluorooctanoate (APFO) in aqueous solution: Into a test tube, 4 mL of a methylene blue solution (12 g of sulfuric acid was gradually added to about 500 mL of water, followed by cooling, then 0.03 g of methylene blue and 50 g of anhydrous sodium sulfate were dissolved therein, and water was added to 1 L) and 5 mL of chloroform were put, and further 0.1 g of a solution having a test sample diluted from 1,000 to 3,000 times was added. The mixture was vigorously shaken and mixed and then left to stand still. Then, the chloroform phase of the lower layer was sampled and filtered through a filter with a pore size of 0.2 μm, whereupon the absorbance at 630 nm was measured by a spectrophotometer. Depending upon the amount of APFO as an anionic surfactant, the chloroform phase exhibits a blue color. Using 0.1 g of an APFO aqueous solution having a preliminarily known concentration, the absorbance was measured in the same manner, and a calibration curve was prepared. Using such a calibration curve, the concentration of APFO in the sample was obtained.

(D) Concentration of APFO in aqueous dispersion of PTFE: Using LC-MS (high performance liquid chromatography equipped with mass spectrometer), a calibration curve was preliminarily prepared from peak areas obtained by using aqueous solutions of APFO with known concentrations, and from the measured peak area of a sample solution, the content was calculated. In the case of the fluorinated emulsifier in the aqueous dispersion of PTFE, 50 g of the aqueous dispersion of PTFE was dried at 70° C. for 16 hours, then APFO was extracted with ethanol, the peak area was measured by LC-MS, and by using the calibration curve, the concentration of APFO in the sample was obtained.

Example 1

1.8 g of APFO and 16.2 g of deionized water were stirred and dissolved in a flask. Then, 6 g of a dried product of a weakly basic ion exchange resin (tradename "Lewatit (registered trademark) MP-62WS", manufactured by LANXESS K.K., styrene/divinylbenzene cross-linked resin, exchange groups: tertiary amine, OH form, average particle size: 0.5 mm, ion exchange capacity: 1.7 eq/L) was put, followed by stirring at from 23 to 28° C. for 24 hours. The weakly basic ion exchange resin was recovered, washed with water and dried, whereby the mass was found increased by 30 mass %, and it was found that 23 mass % of perfluorooctanoic acid was deposited in the recovered weakly basic ion exchange resin. Here, drying of the weakly basic anion exchange resin was carried out in an oven of from 50 to 60° C. until the mass became constant. The time required for the drying was about 12 hours.

Into a flask having a stirring rotor put therein, 10 g of a 1.5 mass % NaOH aqueous solution was put and heated to 80° C. 1 g of the above mentioned weakly basic anion exchange resin having 23 mass % of perfluorooctanoic acid adsorbed thereon was put thereinto, followed by stirring for 30 minutes at from 80° C. to 85° C. and then by thermal filtration to recover the weakly basic ion exchange. The molar ratio of the alkali to the fluorinated emulsifier in the aqueous solution was 6.8:1.

The concentration of perfluorooctanoic acid in the aqueous solution became 2.0 mass %, which indicates that 87 mass % of perfluorooctanoic acid was eluted.

Example 2

This example was carried out under the same conditions as in Example 1 except that the elution was carried out in a 3.0 mass % NaOH aqueous solution at from 70° C. to 75° C. for 15 minutes. The molar ratio of the alkali to the fluorinated emulsifier in the aqueous solution was 13.5:1. The concentration of perfluorooctanoic acid in the aqueous solution became 1.4 mass %, which indicates that 61 mass % of perfluorooctanoic acid was eluted.

Comparative Example 1

This example was carried out under the same conditions as in Example 1 except that the elution was carried out in a 1.5 mass % NaOH aqueous solution at 25° C. for 15 minutes. The molar ratio of the alkali to the fluorinated emulsifier in the aqueous solution was 6.8:1. The concentration of perfluorooctanoic acid in the aqueous solution became 0.3 mass %, which indicates that 13 mass % of perfluorooctanoic acid was eluted.

Comparative Example 2

This example was carried out under the same conditions as in Example 1 except that the elution was carried out in a 1.5 mass % NaOH aqueous solution at from 50° C. to 55° C. for 15 minutes. The molar ratio of the alkali to the fluorinated emulsifier in the aqueous solution was 6.8:1.

The concentration of perfluorooctanoic acid in the aqueous solution became 0.9 mass %, which indicates that 39 mass % of perfluorooctanoic acid was eluted.

Example 3

This example was carried out under the same conditions as in Example 1 except that in Example 1, the 1.5 mass % NaOH aqueous solution was changed to a 2.5 mass % KOH aqueous solution. The molar ratio of the alkali to the fluorinated emulsifier in the aqueous solution was 8:1. The concentration of perfluorooctanoic acid in the aqueous solution became 1.8 mass %, which indicates that 79 mass % of perfluorooctanoic acid was eluted.

Example 4

As the raw material for an aqueous dispersion of a fluorinated polymer, an aqueous emulsion of PTFE obtained by polymerization employing APFO (average primary particle size of dispersed PTFE: 0.25 μm, SSG: 2.21, polymer solid content: 26 mass %) was used.

To this aqueous emulsion of PTFE, 3.2 mass %, based on PTFE, of a nonionic surfactant (tradename "NEWCOL 1308FA" manufactured by Nippon Nyukazai Co., Ltd., molecular formula: $C_{13}H_{27}$—$(OC_2H_4)_8$—$OCH(CH_3)CH_2$—OH, molecular weight: 610) and deionized water were added to obtain an aqueous dispersion of PTFE having the PTFE concentration adjusted to 25 mass %. The APFO concentration in the aqueous dispersion of PTFE was 1,870 ppm. To 500 g of this aqueous dispersion of PTFE, 1.1 g (0.9 mass % based on the PTFE solid content) of a dried product of a weakly basic anion exchange resin (tradename "Lewatit (register trademark) MP-62WS", manufactured by LANXESS K.K.) was introduced, followed by stirring at from 23 to 28° C. for 24 hours. As a result, the APFO concentration in the aqueous dispersion of PTFE after adsorption of the fluorinated emulsifier by the weakly basic anion exchange resin became 240 ppm based on PTFE. The absorptivity of APFO to the theoretical ion exchange capacity was about 10%. From this value, it is calculated that about 16 mass % of perfluorooctanoic acid is adsorbed in the dried weakly basic anion exchange resin.

The aqueous dispersion of PTFE having the weakly basic anion exchange resin mixed thereto, was subjected to filtration, whereby the weakly basic anion exchange resin was recovered and washed with water. Then, into a flask having a stirring rotor put therein, 8 g of a 1.5 mass % NaOH aqueous solution was put and heated to 80° C., and the recovered weakly basic anion exchange resin was put thereinto, followed by stirring for 45 minutes at from 80° C. to 85° C. Thermal filtration was carried out, and in the same manner, thereafter, the weakly basic anion exchange resin was treated with the heated aqueous alkaline solution three times.

The amount of APFO extracted from each heated aqueous alkaline solution was 80 mass % for the first time, 16 mass % for the second time, 3 mass % for the third time, and a total of about 100 mass % by the fourth time, based on the total amount adsorbed on the weakly basic anion exchange resin. The molar ratio of the alkali to the fluorinated emulsifier in the aqueous solution was 24.4:1. Further, from the PTFE coagulum recovered at that time, it was found that the amount of PTFE deposited on the weakly basic anion exchange resin was 2 mass % of the total amount of PTFE and the weakly basic anion exchange resin.

Thereafter, this weakly basic anion exchange resin was washed with water, and when the pH of the washing solution became at most 9, the resin was dried.

Then, 1.0 g of this regenerated weakly basic anion exchange resin was put into 450 g of an aqueous dispersion of PTFE equivalent to the aqueous dispersion of PTFE used to let the fluorinated emulsifier adsorbed on the weakly basic anion exchange resin, in the same manner as the above described first regeneration, followed by stirring for 24 hours at from 23 to 28° C. As a result, the APFO concentration in the aqueous dispersion of PTFE after adsorption of the fluorinated emulsifier by the weakly basic anion exchange resin became 230 ppm based on PTFE, which indicates that the weakly basic anion exchange resin obtained by the first regeneration adsorbed APFO in substantially the same amount as for the first time. And in the same manner as in the first regeneration, the second regeneration was carried out by treatment in a 1.5 mass % NaOH aqueous solution for 45 minutes at from 80° C. to 85° C. In the same manner, the APFO concentration in the aqueous dispersion of PTFE after adsorption of the fluorinated emulsifier by the weakly basic anion exchange resin obtained by the second regeneration became 340 ppm based on PTFE, and the APFO concentration in the aqueous dispersion of PTFE after adsorption of the fluorinated emulsifier by the weakly basic anion exchange resin obtained by the third regeneration became 260 ppm based on PTFE, whereby it was confirmed that the regenerated weakly basic anion exchange resin maintained substantially the same ability to adsorb APFO as in the initial stage. Such adsorption and stirring were further continued for 100 hours, whereby the APFO concentration became 100 ppm based on PTFE.

INDUSTRIAL APPLICABILITY

The method for regenerating a basic anion-exchange resin of the present invention is applicable to regeneration of a basic anion exchange resin having a fluorinated emulsifier adsorbed thereon from various liquids containing fluorinated emulsifiers. The regenerated basic anion-exchange resin can be used repeatedly for adsorption and removal of a fluorinated emulsifier from various liquids containing fluorinated emulsifiers. Further, the aqueous dispersion of a fluorinated polymer having the fluorinated emulsifier concentration reduced, which is obtainable by contacting the regenerated basic anion exchange resin with an aqueous dispersion of a fluorinated polymer, is applicable to various applications as it is or after being concentrated, followed by optional blending. For example, in addition to its application to an electronic material such as a printed board, an application to a roof material for a film-structured building, an application to surface coating of kitchen utensils, an application to a fluorinated polymer fiber such as PTFE fiber, an application to prevent dusts, an application to a binder for an active material for a battery, an application for incorporation to a plastics, etc. may be mentioned.

The entire disclosure of Japanese Patent Application No. 2005-300068 filed on Oct. 14, 2005 including specification, claims and summary is incorporated herein by reference in its entirety.

What is claimed is:

1. A method for regenerating a basic anion-exchange resin, which comprises contacting, in the absence of an organic solvent, a basic anion-exchange resin having a fluorinated emulsifier adsorbed thereon with an aqueous alkaline solution having a temperature of from 60 to 105° C. to elute the fluorinated emulsifier thereby to regenerate the basic anion-exchange resin.

2. The method for regenerating a basic anion-exchange resin according to claim 1, wherein the basic anion-exchange resin having a fluorinated emulsifier adsorbed thereon is one having a fluorinated emulsifier adsorbed on a basic anion-exchange resin by contacting the basic anion-exchange resin with an aqueous dispersion of a fluorinated polymer.

3. The method for regenerating a basic anion-exchange resin according to claim 1, wherein the basic anion-exchange resin having a fluorinated emulsifier adsorbed thereon is one having a fluorinated emulsifier adsorbed on a basic anion-exchange resin by contacting the basic anion-exchange resin with a waste water containing a fluorinated emulsifier discharged after coagulation of an aqueous dispersion of a fluorinated polymer.

4. The method for regenerating a basic anion-exchange resin according to claim 1, wherein the basic anion-exchange resin having a fluorinated emulsifier adsorbed thereon is one having a fluorinated emulsifier adsorbed on a basic anion-exchange resin by contacting the basic anion-exchange resin with an aqueous solution having absorbed therein a fluorinated emulsifier contained in air discharged in a step of drying a fluorinated polymer obtained by coagulation of an aqueous dispersion of the fluorinated polymer.

5. The method for regenerating a basic anion-exchange resin according to claim 1, wherein the basic anion-exchange resin is a weakly-basic anion-exchange resin.

6. The method for regenerating a basic anion-exchange resin according to claim 1, wherein the basic anion-exchange resin has an ion exchange capacity of from 1 to 2.5 eq/L.

7. The method for regenerating a basic anion-exchange resin according to claim 1, wherein the amount of the fluorinated emulsifier adsorbed on the basic anion-exchange resin is from 5 to 60 mol % based on the ion exchange capacity of the basic anion-exchange resin.

8. The method for regenerating a basic anion-exchange resin according to claim 1, wherein the molar ratio of the alkali to the fluorinated emulsifier in the aqueous alkaline solution is from 1:1 to 200:1.

9. The method for regenerating a basic anion-exchange resin according to claim 1, wherein the fluorinated emulsifier is a fluorinated organic acid which may have an etheric oxygen atom, or its salt (ammonium salt or alkali metal salt).

10. The method for regenerating a basic anion-exchange resin according to claim 1, wherein the fluorinated polymer contained in the aqueous dispersion of the fluorinated polymer is at least one member selected from the group consisting of a polytetrafluoroethylene, a modified polytetrafluoroethylene, a tetrafluoroethylene/hexafluoropropylene copolymer, a tetrafluoroethylene/perfluoro(alkyl vinyl ether) copolymer, an ethylene/tetrafluoroethylene copolymer, an ethylene/chlorotrifluoroethylene copolymer, a polychlorotrifluoroethylene, a polyvinylidene fluoride, a polyvinyl fluoride, a tetrafluoroethylene/propylene copolymer, a tetrafluoroethylene/propylene/vinylidene fluoride copolymer, a vinylidene fluoride/hexafluoropropylene copolymer and a vinylidene fluoride/hexafluoropropylene/tetrafluoroethylene copolymer.

* * * * *